A. C. ELLITHORPE.
Elevator.

No. 229,982. Patented July 13, 1880.

Witnesses:
O. W. Bond
H. F. Bruns

Inventor:
Albert C. Ellithorpe

UNITED STATES PATENT OFFICE.

ALBERT C. ELLITHORPE, OF CHICAGO, ILLINOIS.

ELEVATOR.

SPECIFICATION forming part of Letters Patent No. 229,982, dated July 13, 1880.

Application filed September 2, 1879.

*To all whom it may concern:*

Be it known that I, ALBERT C. ELLITHORPE, of the city of Chicago, Cook county, State of Illinois, have invented new and useful Improvements in Elevators, of which the following is a full description, reference being had to the accompanying drawings, in which—

Figure 1:
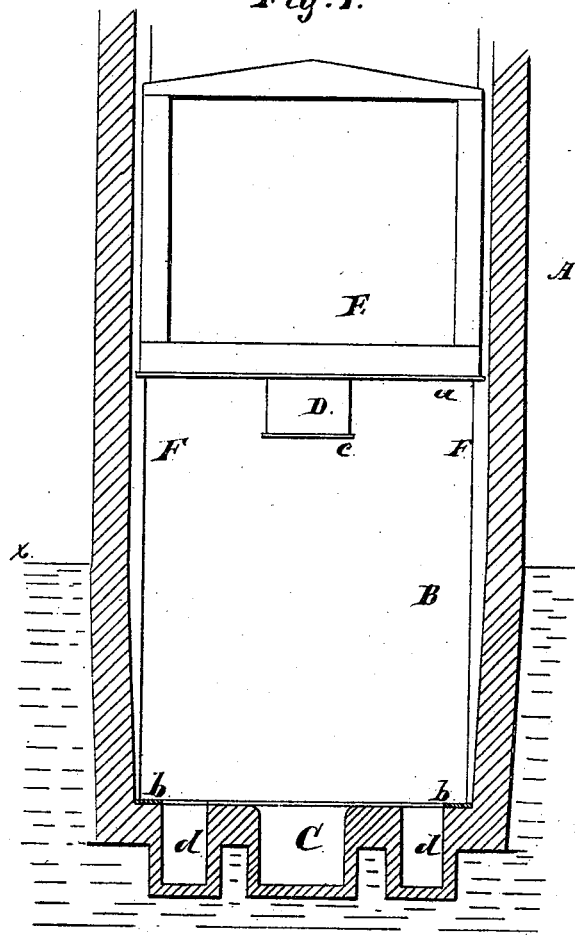
Figure 2:
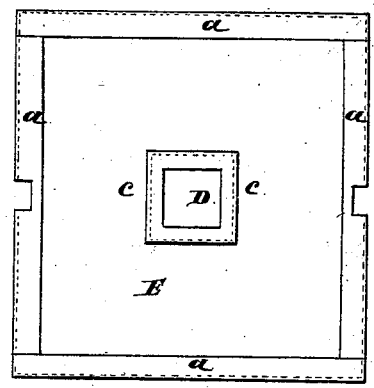
Figure 3:
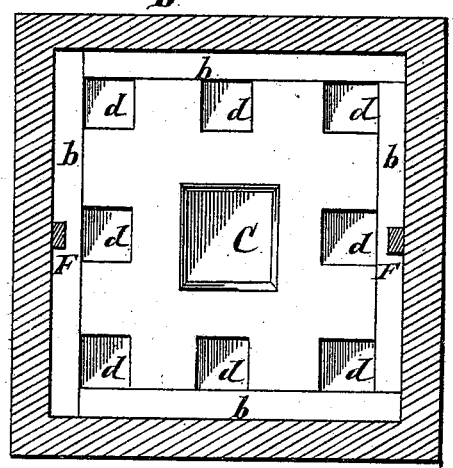

Figure 1 is a vertical section; Fig. 2, a bottom view of the cage or platform, and Fig. 3 a top or plan view of the bottom of the shaft.

The object of this invention is to improve the elevator patented to me in 1879, so as to make the protection to the case or platform in falling and its passage or load secure from injury in falling; and its nature consists in combining with a shaft tapering inward near the bottom the devices hereinafter described, in providing the bottom with air cells or pits, and in providing the bottom of the cage or platform with a plunger fitting into a corresponding cavity in the bottom of the shaft.

In the drawings, A indicates an ordinary shaft; B, the inwardly and downward inclined bottom of the shaft; C, a central opening or cavity, into which the plunger fits; D, the plunger; E, any ordinary cage or platform; F, the guideways; $a$, a rubber or other elastic border or packing around the bottom of the cage; $b$, a rubber or other elastic border around the bottom of the shaft; $c$, a similar elastic border around the bottom of the plunger, and $d$ air cells or pits distributed over the bottom of the shaft.

The shaft A and its guideways F are made in any of the usual or well-known ways, as is also the cage E, except its under part or bottom, which is provided with a border, $a$, acting as a packing, and as a cushion when it comes in contact with the elastic border $b$ at the bottom and the plunger D.

The plunger may be made hollow or solid, and under ordinary circumstances it is made about eighteen inches long and about the same distance across. It is provided with an elastic cushion, $c$, as shown, and may be made square, round, or in other convenient form.

The pit C should have a corresponding form and its upper edges slightly rounded off to insure the easy and safe entrance of the plunger.

The air cells or pits $d$ are distributed over the bottom of the shaft, and are of a smaller size than the pit C, and may have an equal or less depth. The object or purpose of these cells is to prevent the entire escape of compressed air when the cage falls, and as they continue to act until all movement of the cage is arrested they act as cushions and prevent any concussions even of the elastic parts or borders $a$ $b$, which concussion might occur were the bottoms of the shaft and cage flat or smooth.

The lower part of the shaft B is inwardly inclined as it projects downward, commencing at or about the place of its lowest regular stop. (Shown by the line X in Fig. 1.) Where there are no impediments—such as the foundations for the main or cross walls—I sink the part B into the earth with all sides equally inclined; but when such impediments or others exist I make the incline on one, two, or three sides and correspondingly increase the incline, so as to press about the same quantity of air.

The incline for the four sides should leave a space of about two inches around the cage tapering in, so that the bottom of the shaft will just equal the dimensions of the bottom of the cage.

If for any reasons the extension of the shaft cannot be tapered, then I increase the size of the plunger and taper the pit C, so that it, with the plunger, will take the same action. When the tapering part cannot be excavated below the usual shaft-bottom or stops above the lower floor of the building, I then suspend the bottom part, B, from or place it below such floor, in which case it must be strongly suspended or supported sufficiently to resist the falling of a loaded cage.

The tapering of the part B is of great utility without the other parts of my improvement, which are added to remove all shocks, jars, or concussions and perfect the successful landing of a falling cage; and I do not limit myself to these added improvements in the use of such tapering bottom extension or part of an elevator-shaft.

What I claim as new, and desire to secure by Letters Patent, is—

1. The combination of the cage E, tapering shaft-section B, and the air cells or pits $d$ in the horizontal shaft-bottom, constructed and operating substantially as described.

2. The combination of the cage E and plunger D with the tapering section B, pit C, and air-pits $d$, substantially as specified.

3. The combination of the cage E and cushions $a$ with the inclined section B and cushions $b$, substantially as and for the purpose described.

4. The combination of the cage E, plunger D, and cushion $a$ with the inclined or tapered section B, opening C, cushion $b$, and air cells or pits $d$, substantially as set forth.

ALBERT C. ELLITHORPE.

Witnesses:
O. W. BOND,
J. C. POLLEY, Jr.